United States Patent

[11] 3,550,986

[72] Inventor Yoshio Takahashi
Tokyo, Japan

[21] Appl. No. 688,161
[22] Filed Dec. 5, 1967
[45] Patented Dec. 29, 1970
[73] Assignee Pioneer Electronic Corporation
Tokyo, Japan
[32] Priority Dec. 5, 1966, Mar. 24, 1967, Oct. 10, 1967
[33] Japan
[31] Nos. 41/79369, 42/17926 and 42/64877

[54] RECORD PLAYER PROVIDED WITH AN AUTOMATIC CONTROL MECHANISM
2 Claims, 19 Drawing Figs.

[52] U.S. Cl. 274/15
[51] Int. Cl. G11b 17/06
[50] Field of Search 274/10, 13, 14, 15

[56] References Cited

UNITED STATES PATENTS

| | | | |
|---|---|---|---|
| 3,452,991 | 8/1969 | Rabe | 33/215 |
| 3,245,688 | 4/1966 | Ryan | 274/1 |
| 2,845,272 | 7/1958 | Kamler | 274/14 |
| 2,602,668 | 7/1952 | Finneran et al. | 274/15 |

FOREIGN PATENTS

| | | | |
|---|---|---|---|
| 968,524 | 1964 | Great Britain | 33/215 |

*Primary Examiner*—Leonard Forman
*Assistant Examiner*—Dennis A. Dearing
*Attorney*—Sughrue, Rothwell, Mion, Zinn and MacPeak

ABSTRACT: A record player is provided with a motor for driving the turntable and a separate independent drive for moving the tone arm from a position on a record to the rest position. The independent drive means may be a spring drive or a separate motor. In either case the independent drive is initiated upon the tone arm reaching a predetermined point during playback or by manual reset means.

RECORD PLAYER PROVIDED WITH AN AUTOMATIC CONTROL MECHANISM

BACKGROUND OF THE INVENTION

This invention relates broadly to the field of record players and more particularly to the controls therefor.

With the prior art, it was very difficult to provide an automatic control mechanism for a record player which did not harm the idler or the driving belt. Since the driving force for the tone arm was provided by the inertia of a turntable, a heavy load would suddenly be added to the turntable when the tone arm was moved from a record disc to an arm rest or from the arm rest to a record disc, and at this time, it often happened that the idler, especially, the driving belt would slip, causing undue wear and tear on the mechanism.

In this invention, on the other hand, the driving force for the tone arm is not provided by inertia of the turntable but by separate power source, for example, a driving spring or a control motor. The inertia of the turntable is not used except for a slight bit just before the tone arm return mechanism begins to operate. In this case, the turntable causes a lever to rotate which can be rotated by a very light force and by this action the tone arm returned mechanism is operated by the provided power source. Therefore, the idler or the driving belt is not subjected to an irregular force.

Another problem in the prior art is the rare occurence when a detector, which detects an end of playback of a disc misses its operation. For example, the tone arm begins to return to the arm rest before the disc has completely played. On the other hand, in this invention, the detector will never miss in its operation.

Also, in the prior art, it often happens that the tone arm is subjected to an irregular force caused by the detector or the tone arm returned mechanism during the playback period whereby the disc or the stylus are harmed. But, in this invention, the tone arm received little irregular force.

SUMMARY OF THE INVENTION

An object of the present invention is to provide an improved record player in which a turntable and a tone arm are not interfered with in their operation by an irregular force caused by the tone arm return mechanism.

Another object of the present invention is to provide an improved record player in which a detector for detecting the end of playback of a disc never misses its operation.

In the first embodiment of this invention, when the tone arm is moved onto a record disc from an arm rest, an idler is pressed between a shaft of a phono-motor and a turntable, a switch for the phono-motor is turned to ON state and the playback of the disc is begun After playing the whole disc, the stylus of the tone arm is led into a last groove in which no signal is recorded, a traversing pin extending down from the bottom of the turntable causes a lever to rotate. By this action, the control motor begins to rotate and continues its operation for a certain period. During the period, the tone arm is lifted up and moved to the arm rest, the idler is set free and the switch for the phono-motor is turned to OFF state.

In the second embodiment of this invention, when the tone arm is moved to an outer position on the disc which is placed on the turntable upon operation of a start lever, a rotary plate rotates against the pulling force of a driving spring and the rotary plate rotates against the pulling force of a driving spring and the rotary plate is then locked by a lock means, for example, a cam lever. By this operation, the driving spring is tensioned and the force of the spring is used when the tone arm is to return to the arm rest. At the same time, the turntable begins to rotate and the tone arm descends slowly on the disc. After playing the whole of the disc, and the stylus of the tone arm is led into a last groove in which no signal is recorded, a traveling pin extending down from the bottom of the turntable causes a lever to rotate. By this action, the rotary plate is unlocked and is rotated by the above-mentioned force of the driving spring. During the rotating period, the tone arm is lifted up and is moved around to the arm rest, a switch is turned to OFF state and the turntable stops rotating.

BRIEF DESCRIPTION OF THE DRAWINGS

FIG. 1 is a plan view of a record player embodying the invention with the turntable removed;

FIG. 2 is a front sectional view of the record player taken on section line 2–2 of FIG. 1;

FIG. 3 is a side sectional view of the record player taken on section line 3–3 of FIG. 1;

FIG. 4 is a view of the switch circuit of the first embodiment;

FIG. 5 is a plan view of a second embodiment with the parts in the inoperative position;

FIG. 6 is a plan view similar to FIG. 5 with the tone arm moved to the outer edge of the disc;

FIG. 7 is a plan view similar to FIG. 6 immediately after the starting lever has been operated;

FIG. 8 is a plan view similar to FIG. 7 with the parts in playback position;

FIG. 9 is a detailed plan view of the spring mechanism and the locking mechanism of FIG. 5;

FIG. 10 is a side elevation of the device in FIG. 9;

FIG. 11 is a detailed plan view of the dashpot arrangement for the tone arm;

FIG. 12 is a side elevational view of the device in FIG. 11;

FIG. 13 is a detailed plan view of the detector arm of FIG. 5;

FIG. 14 is a side elevational view of the device in FIG. 13;

FIG. 15 is a plan view of a further modified device;

FIG. 16 is a detailed plan view of the spring mechanism of FIG. 15;

FIG. 17 is a front elevational view of the device in FIG. 16;

FIG. 18 is a detailed plan view of the dashpot arrangement of FIG. 15; and

FIG. 19 is a front elevational view of the device in FIG. 18.

DESCRIPTION OF THE PREFERRED EMBODIMENT

Figure 1:
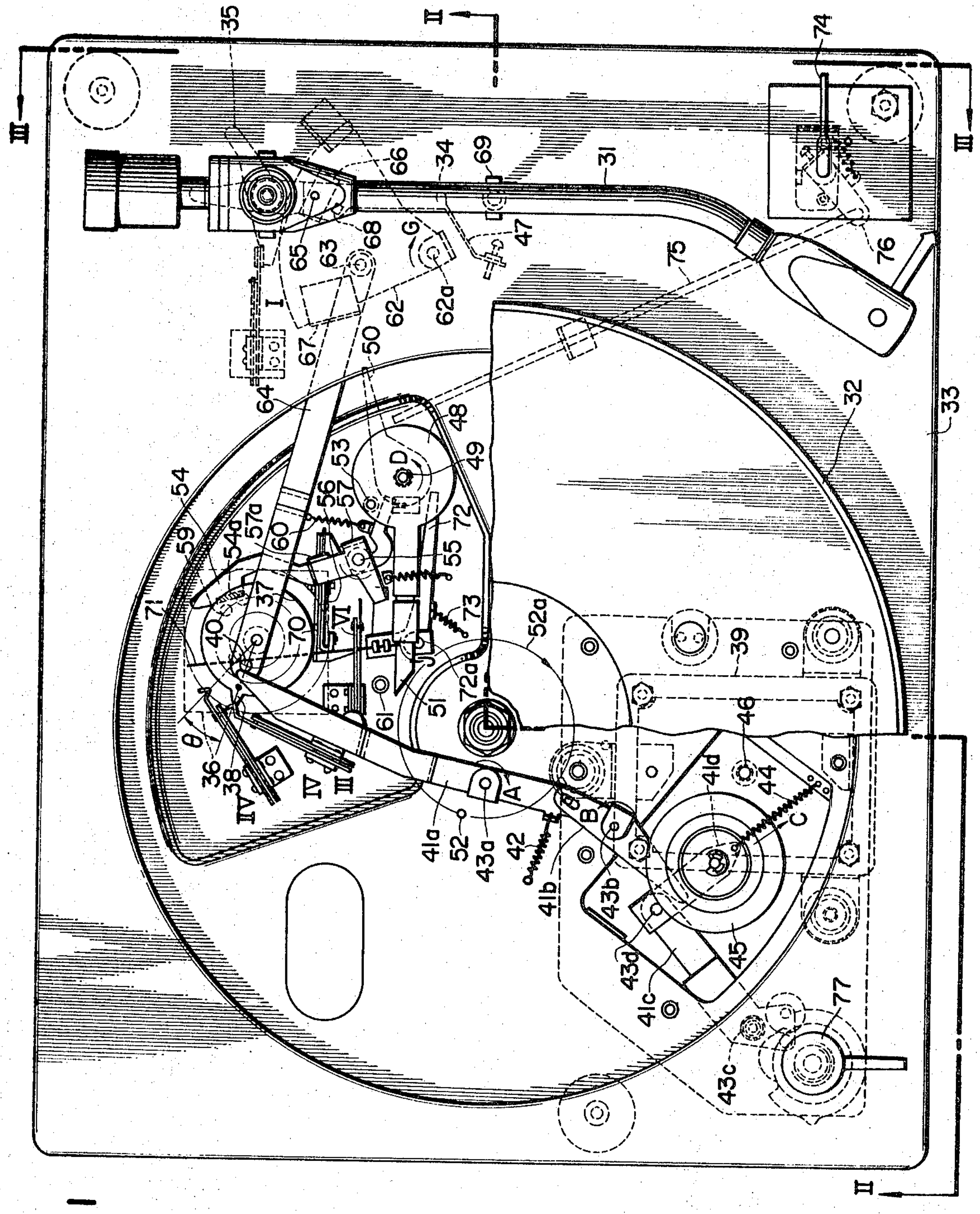
FIGS. 1 to 4 relate to the first embodiment of this invention.
Figure 2:
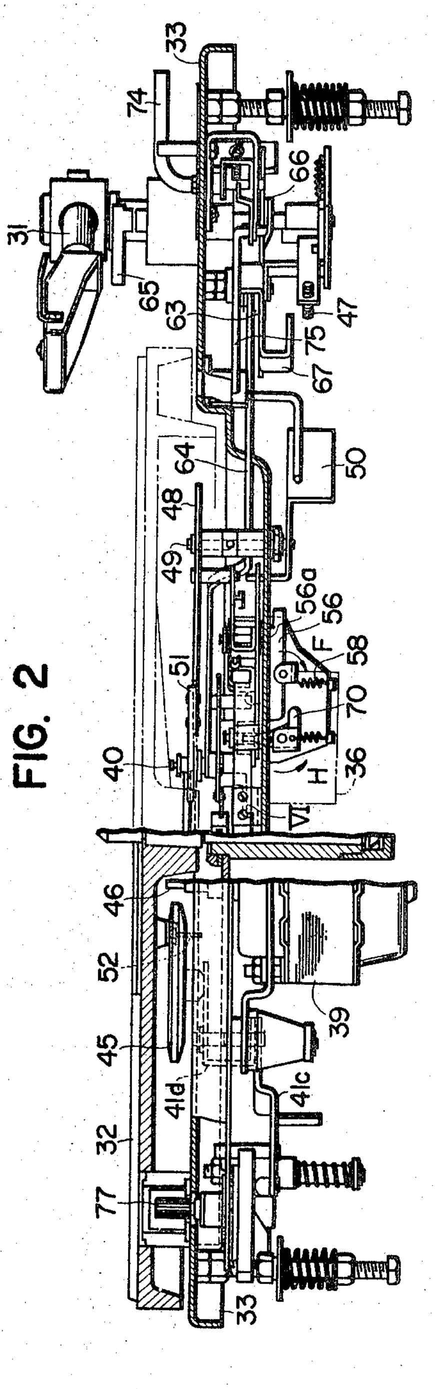
Figure 3:
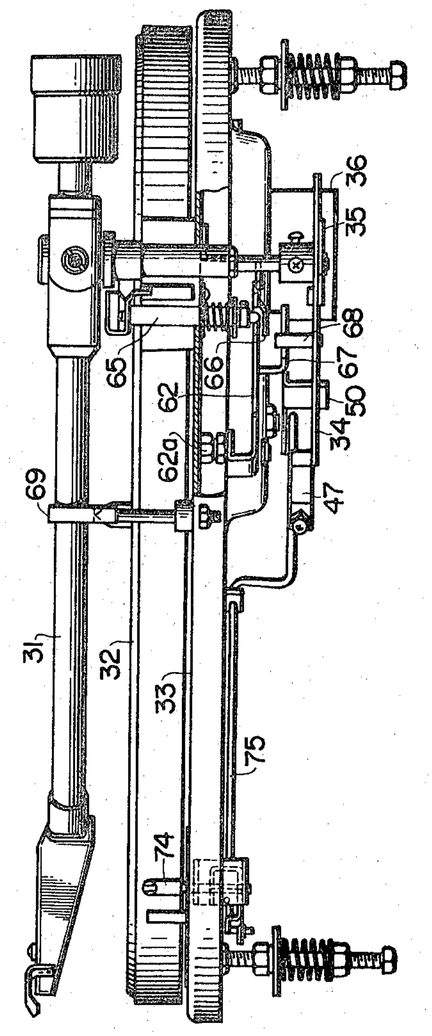

In the drawings, tone arm 31 and turntable 32 are mounted on board 33 and arm plate 34 and subarm plate 35 are secured on a shaft of tone arm 31. Control motor 36 provides a drive force for rotary plate 37 which rotates slowly through one revolution per one cycle of playback and controls the movement of each part. A projection 38 projects from the outer side of rotary plate 37. Phono-motor 39 drives the turntable 32. Control pin 40 extends upwardly from rotary plate 37. Levers 41*a*, 41 *b*, 41*c* and 41*d* cooperate with each other in their operation and each lever 41*a*, 41*b*, 41*c* and 41*d* has its own shaft 43*a*, 43*b*, 43*c*, and 43*d* but shaft 43*d* joins lever 41*c* with lever 41*d*, and is not fixed to board 33, springs 42 and 44 bias levers 41*a* and 41*d*, respectively. Idler 45 transmits the driving force from drive shaft 46 of phono-motor 39 to turntable 32. Pushing plate 47 is attached to arm plate 34. Detecting plate 48 is rotatable around shaft 49 of traverse table 50 and is mounted on traverse table 50 with little friction and detecting lever 51 extends from detecting plate 48. Traversing pin 52 extends down from the bottom of turntable 32 and travels in an orbit 52*a*. Pin 53 is attached to the bottom of detecting plate 48. Lever 54 has a pressure part 54*a* and is pivoted on shaft 55. Lock lever 56 has a triangular projection 56*a*. Switch lever 57 is pivoted on the same shaft 55 with lever 54 and attachment 57*a* which is attached to switch lever 57 has two functions, that is, it pushes down above-mentioned projection 56*a* and it limits the angle of rotation of lever 54 when said lever 54 rotates in the direction of arrow E. Spring 58 pulls lock lever 56. Control pin 59 extends down from rotary plate 37. Spring 60 pulls lever 54. Pin 61 stops rotation of detecting lever 51. Arm supporter 62 is mounted on shaft 62*a* and has a slope 66 on which elevation pin 65 slides up and down so that elevation pin 65 causes the tone arm 31 to lift up and descend. Plate 67 is attached to the bottom of arm supporter 62 and when pin 68 of arm plate 34 is pushed by plate 67, tone arm 31 is moved around to arm rest 69. Cam lever 70 is usually biased by a spring and is stayed as shown in FIG. 1. Set bar 71 is attached to set lever 72 and rotates together therewith around shaft 72*a* and spring 73 biases set lever 72. Cutoff lever 74 acts to stop the playback even if the disc is not completely played back. Rod 75 is moved by lever 76. Selector knob 77 selects the rotations per minute of turntable 32. Switches I, II, IV, V and VI are concerned with control motor 36 and switch III is concerned with phono-motor 39. Switch II is operated together with switch V and switch III is operated together with switch IV. Switches I, III, IV and VI are normally open switches and switches II and V are normally closed switches.

Now, the first embodiment of this invention operates as follows.

When tone arm 31 is put on a disc (not shown) which is placed on turntable 32, arm plate 34 and subarm plate 35 rotate together with tone arm 31; switch I is turned to ON state; control motor 36 begins operating with current which runs through switches I and II; projection 38 which keeps switches III and IV in OFF state rotates away, therefore, said switches III and IV turn to ON state and phono-motor 39 begins operating with current which runs through switch III. On the other hand, control pin 40 which extends up from rotary plate 37 frees lever 41*a* and each lever 41*a* and 41*b* rotate in the direction of arrows A and B, around shafts 43*a* and 43*b*, due to the bias of spring 42. At this time, as lever 41*b* frees shaft 43*d*, levers 41*c* and 41*d* are pulled by spring 44. Idler 45 which is pinned on lever 41*d* is moved in the direction of arrow C, and is engaged between drive shaft 46 and turntable 32 so that the driving force may be transmitted from drive shaft 46 to turntable 32.

With above-mentioned action, turntable 32 begins to rotate and the playback of the disc is started. When rotary plate 37 moves through an angle of $\Theta°$, switches II and V are turned to OFF state by projection 38. The circuit containing switches I and II and the circuit containing switches IV and V are opened and control motor 36 stops rotating.

As the disc is played back and tone arm 32 moves slowly toward the center of turntable 32, arm plate 34 which is located under board 33 and is connected with the shaft of tone arm 31 also moves slowly and pushing plate 47 approaches traverse table 50 which is mounted on the shaft 49 with detecting plate 48.

When the playback is finished and the stylus of tone arm 31 is led into the last groove of the disc, tone arm 31 is moved quickly toward the center of the disc, and at the same time, pushing plate 47 pushes traverse table 50; detecting plate 48 is rotated in the direction of arrow D by traverse table 50; detecting lever 51 which extends from detecting plate 48 rotates quickly into orbit 52*a* of pin 52 and the lever 51 is rotated further by traveling pin 52. Pin 53 which is attached to the bottom of detecting plate 48 makes lever 54 rotate in the direction of arrow E around shaft 55. Lock lever 56 is transversely placed under lever 54. Attachment 57*a* of switch lever 57 slips on lock lever 56 on the slope projection 56*a;* that is, switch lever 57 which cooperates in moving with lever 54 pushes lock lever 56 down in the direction of arrow F, against the pulling force of spring 58. After this, lock lever 56 is quickly returned to the first position by spring 58 when attachment 57*a* has passed the slope of projection 56*a*. By this operation, switch lever 57 is stopped by projection 56*a* of lock lever 56, and can not rotate to return. Switch VI is pressed by switch lever 57 and is turned to ON state and control motor 36 begins to rotate plate 37 and switches I and II, and IV and V turn to ON state. As rotary plate 37 rotates, control pin 59 passes pressing part 54*a* of lever 54 and lever 54 is rotated by spring 60 in reverse with respect to arrow E and pushes pin 53 of detecting plate 48. At this time, detecting lever 51 has already been freed from traversing pin 52, detecting plate 48 rotates against pin 61 and lever 54 and detecting plate 48 is no longer rotated by traversing pin 52. Crank 64 connects control pin 40 which is secured on rotary plate 37 with axle 63 which is secured on arm supporter 62 and crank 64 moves according to the rotation of rotary plate 37 causing arm supporter 62 to rotate around its axle 62*a*. When rotary plate 37 rotates through the first half, arm supporter 62 rotates in the direction of arrow G, and when rotary plate 37 rotates through the last half, arm supporter 62 rotates opposite to arrow G. The slope 66 on arm supporter 62 causes elevation pin 65 which is positioned under tone arm 31 to move up and down thereon in accordance with the movement of arm supporter 62. When arm supporter 62 moves in the direction of arrow G, elevation pin 65 is moved up slowly and tone arm 31 therewith, that is, the stylus is lifted up from the disc. Plate 67, which is secured to arm supporter 62, moves around with arm supporter 62 in the direction of arrow G, and pushes pin 68 which extends from arm plate 34 causing tone arm 31 to return to arm rest 69. Subarm plate 35, which moves around with arm plate 34, causes switch 1 to turn OFF state but control motor 36 is operated continuously by the current which runs through switches IV and V, thereby continuously rotating plate 37. Therefore, as arm supporter 62 moves in the reverse direction, elevation pin 65 slips down again along slope 66 and tone arm 31 descends on arm rest 69.

Rotary plate 37, during its rotating period, causes cam lever 70 to rotate in the direction of arrow H with its projection 38 and as cam lever 70 causes lock lever 56 to rotate toward arrow F, switch lever 57 which has been stopped by projection 56*a* of lock lever 56 is set free to rotate opposite to arrow E and cause switch VI to turn to OFF state. However, control motor 36 operates continuously by current which runs through switches IV and V. According to the rotation of rotary plate 37, control pin 59, which extends from the bottom of rotary plate 37, pushes set bar 71 and set lever 72, which is united with set bar 71, is rotated in the direction of arrow J around shaft 72*a*. Traverse table 50 is rotated opposite to arrow D around shaft 49. Since detecting plate 48 which is mounted with traverse table 50 on the same shaft 49 has been stopped by lever 54 and pin 61, traverse table 50 can be rotated but detecting plate 48 can not. When rotary plate 37 rotates, control pin 40, which extends from rotary plate 37, pushes lever 41*a* and makes it rotate opposite to arrow A around shaft 43*a*. Idler 45 is disconnected from turntable 32 and drive shaft 46, because levers 41*a*, 41*b*, 41*c* and 41*d* move in the reverse order with respect to the operation whereby idler 45 was pressed to turntable 32 and drive shaft 46. Projection 38, at this time, makes switches III and IV turn OFF state and phono-motor 39 and control motor 36 stop rotating.

Now, the whole mechanism is in standby state again.

Hereinafter, the operation of detecting plate 48 and lever 54 will be described in detail.

At the beginning of operation of this embodiment, when rotary plate 37 rotates an angle of $\Theta$ and projection 38 comes around to the position where switches II and V are turned to OFF state, lever 54 is rotated by control pin 59 in the direction of arrow E. Rotary plate 37 stops when control pin 59 comes around to pressing part 54*a* of lever 54. Lever 54, which has pressed pin 53 of detecting plate 48, is disconnected slightly from said pin 53, therefore, setting detecting board 48 free. At the end of playback, when pushing plate 47 of arm plate 34 pushes traverse table 50, detecting plate 48 and detecting lever 51 can be rotated by a small force which is caused by moving of tone arm 31. Detecting lever 51 is moved around to a large degree and then is rotated still further by traveling pin 52 and pin 53, which is connected to detecting plate 48, pushes lever 54.

In case it is necessary to stop this record player halfway, the problem can be resolved by pulling cutoff lever 74. When cutoff lever 74 is pulled, rod 75 is pushed by lever 76 which is connected to cutoff lever 74. Rod 75 pushes traverse table 50 and makes it rotate so that detecting lever 51 is rotated suddenly and traveling pin 52 causes said detecting lever 51 to rotate still further. Then each part is operated the same as the above-mentioned operation.

In this embodiment, it can be very easy to exchange an idler drive system for a belt drive system. Idler 45 is controlled by not tone arm 31, but control motor 36, and tone arm 31 is returned to arm rest 69 not by the inertia of turntable 32, but by control motor 36. Therefore, the stylus of tone arm 31, the record disc, and idler 45 (or driving belt) are not subjected to irregular forces and are not harmed. Inertia of turntable 32 is used only in case for detecting lever 51 which can be rotated very easily at the end of playback.

The second embodiment of the present invention will be described in detail.

Referring now from FIG. 5 to FIG. 14, arm plate 81 is joined with tone arm 78 by shaft 82 and is provided with a pin 83. Plate 84 is rotatably set on shaft 85 of rotary plate 91. Rotary plate 91 has a spring plate 86 mounted thereon. Spring plate 86 has an angle 98 whereby plate 84 is locked and when plate 84 is pushed by pin 83, said plate 84 is unlocked and then pushed quickly by spring plate 86. Switch 95 is a microswitch, but any kind of switch may be used. The distance between the top of arm plate 81 and traverse table 102 can be adjusted by set screw 101.

Hereinafter, the operation of the second embodiment will be described in detail.

Figures 4, 5:
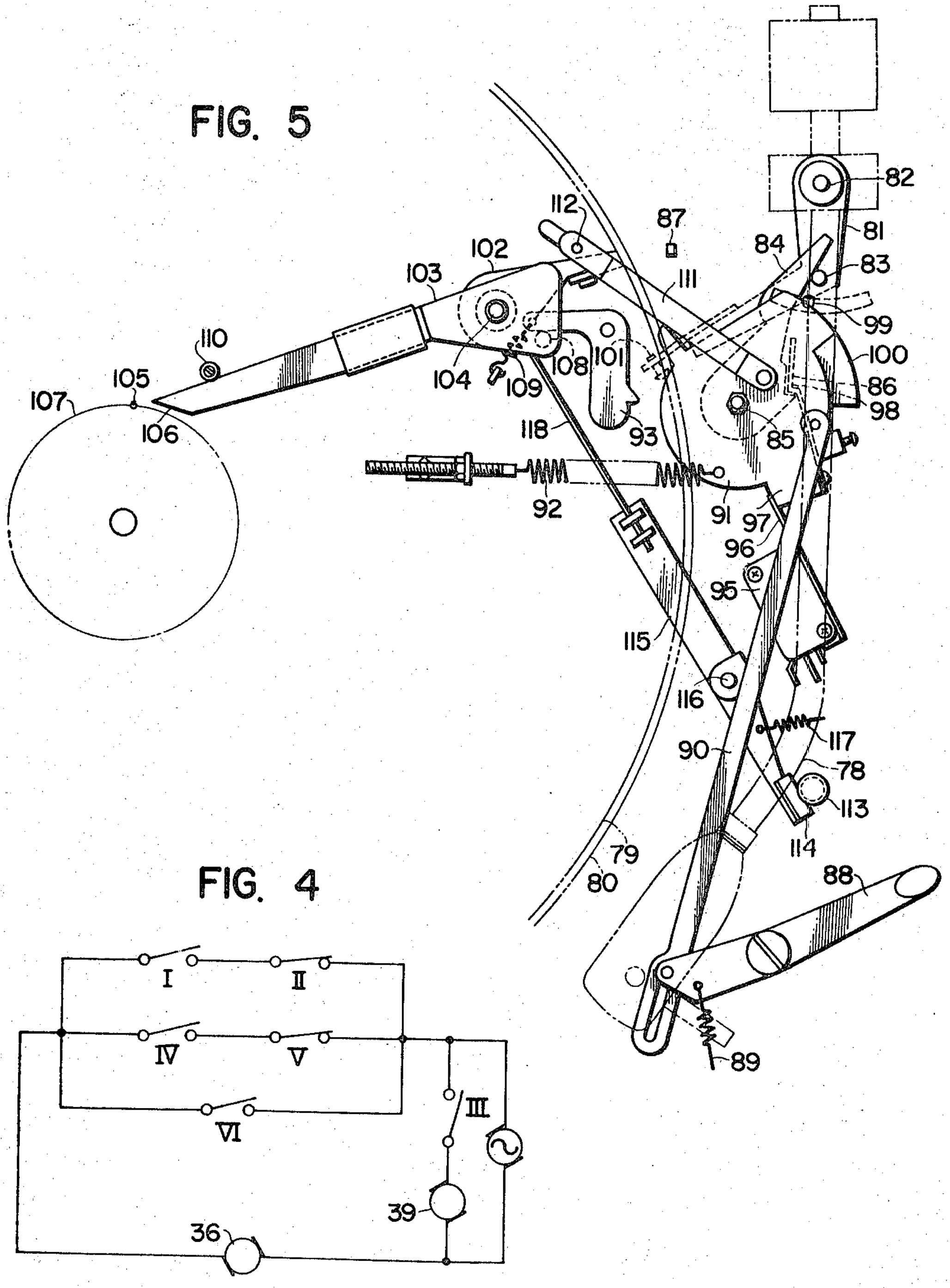
FIGS. 5 to 14 relate to the second embodiment of this invention.
Figure 6:
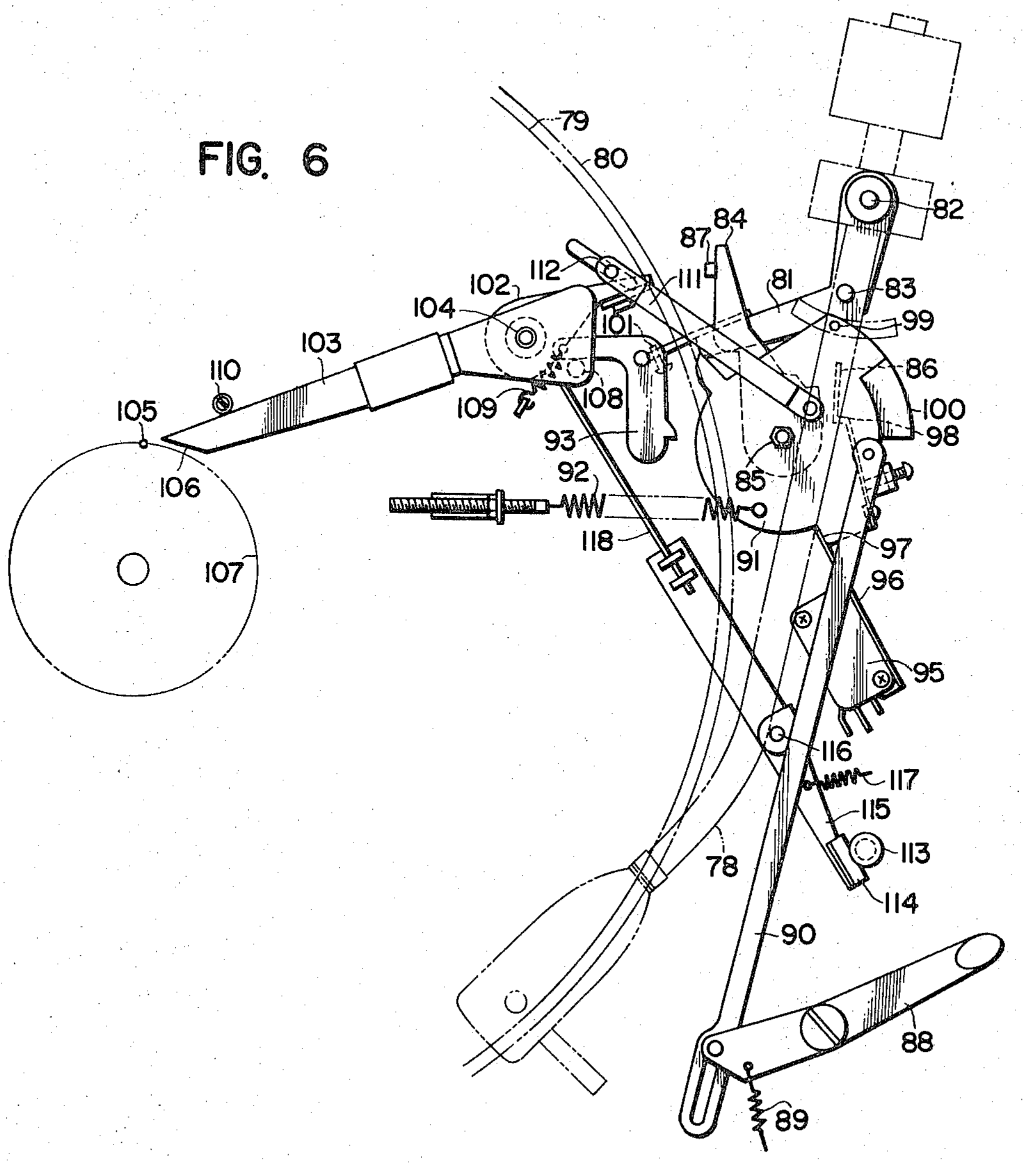
Figure 7:
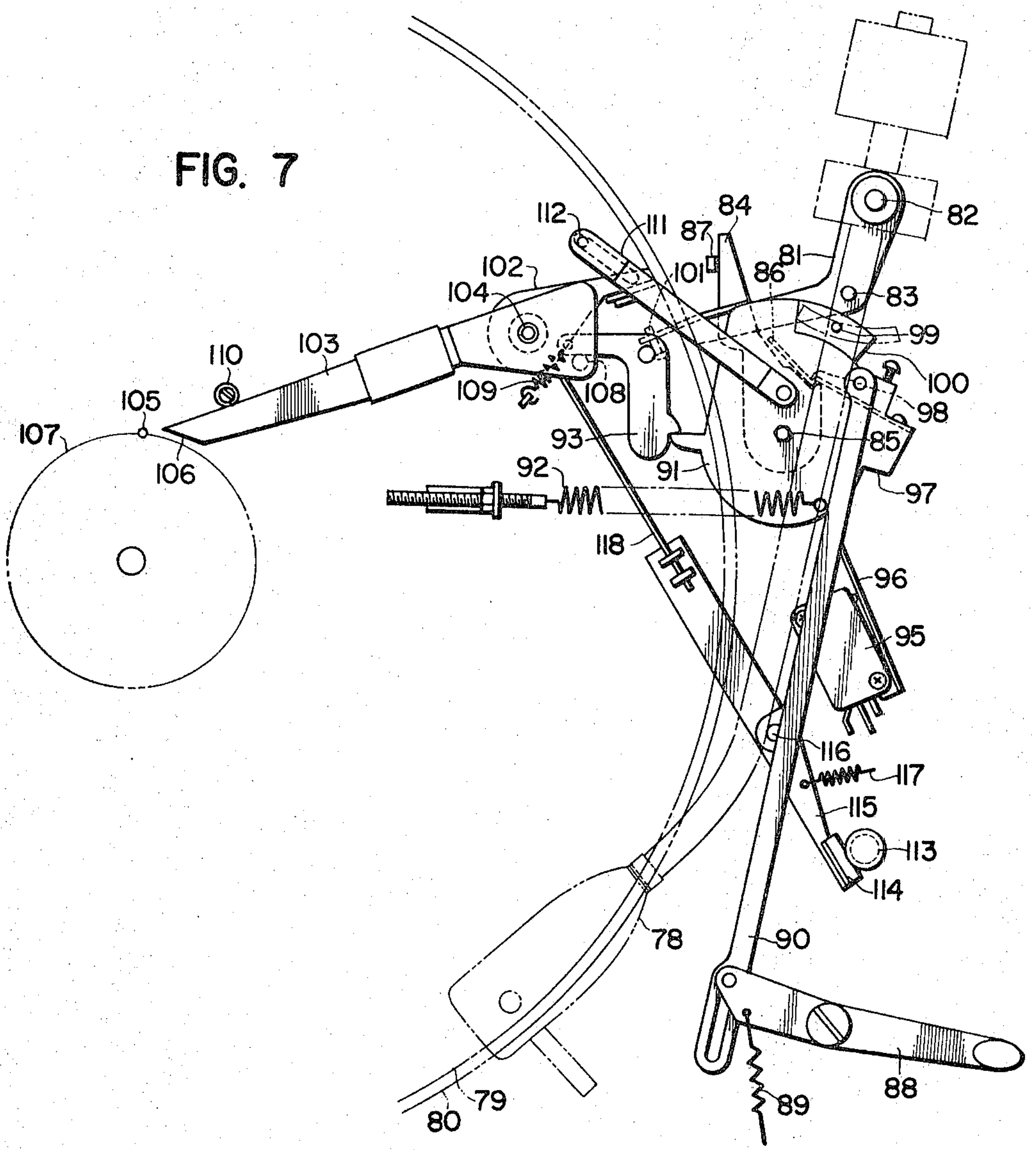
Figure 8:
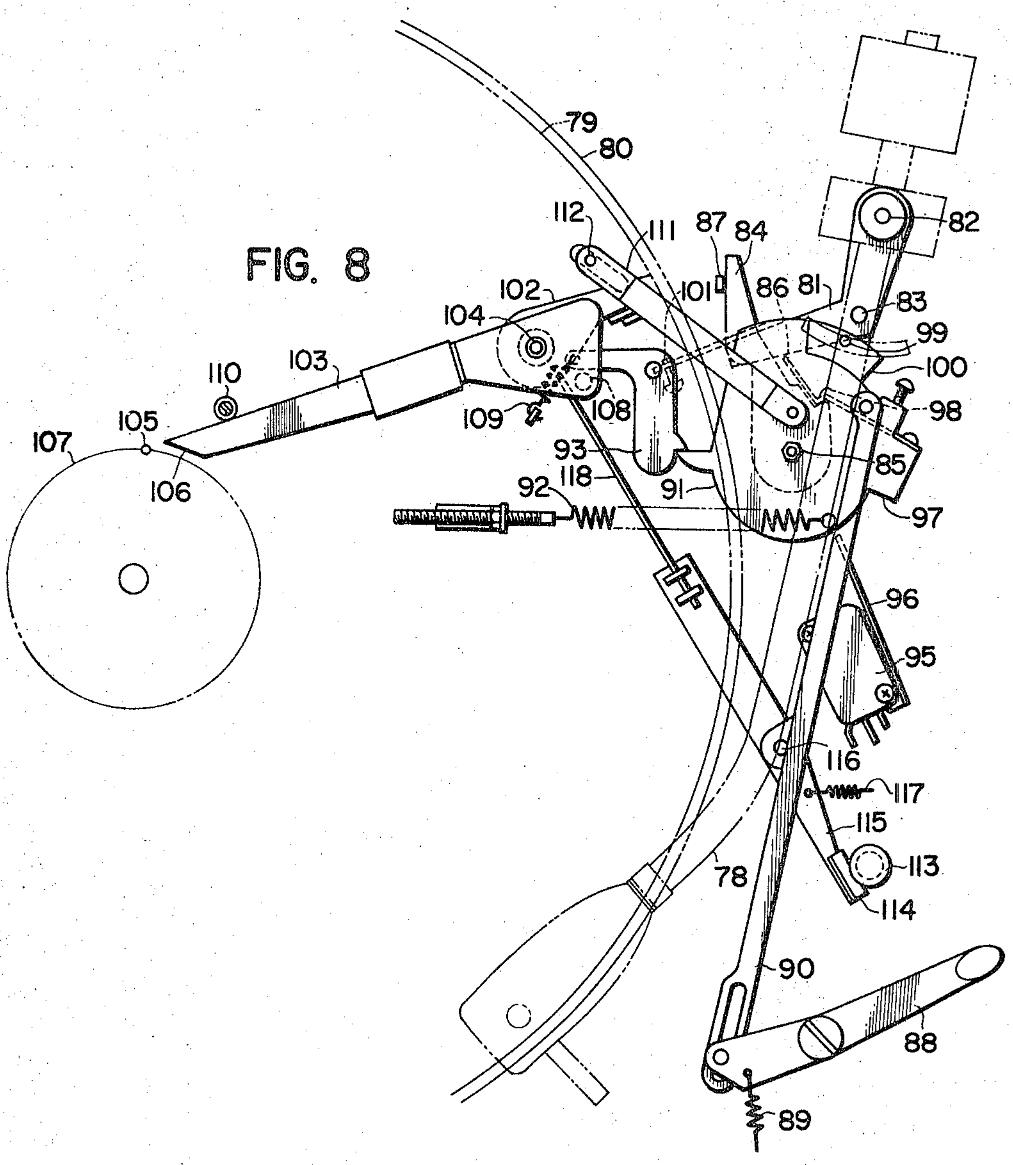
Figures 9, 10, 11, 12, 13, 14:
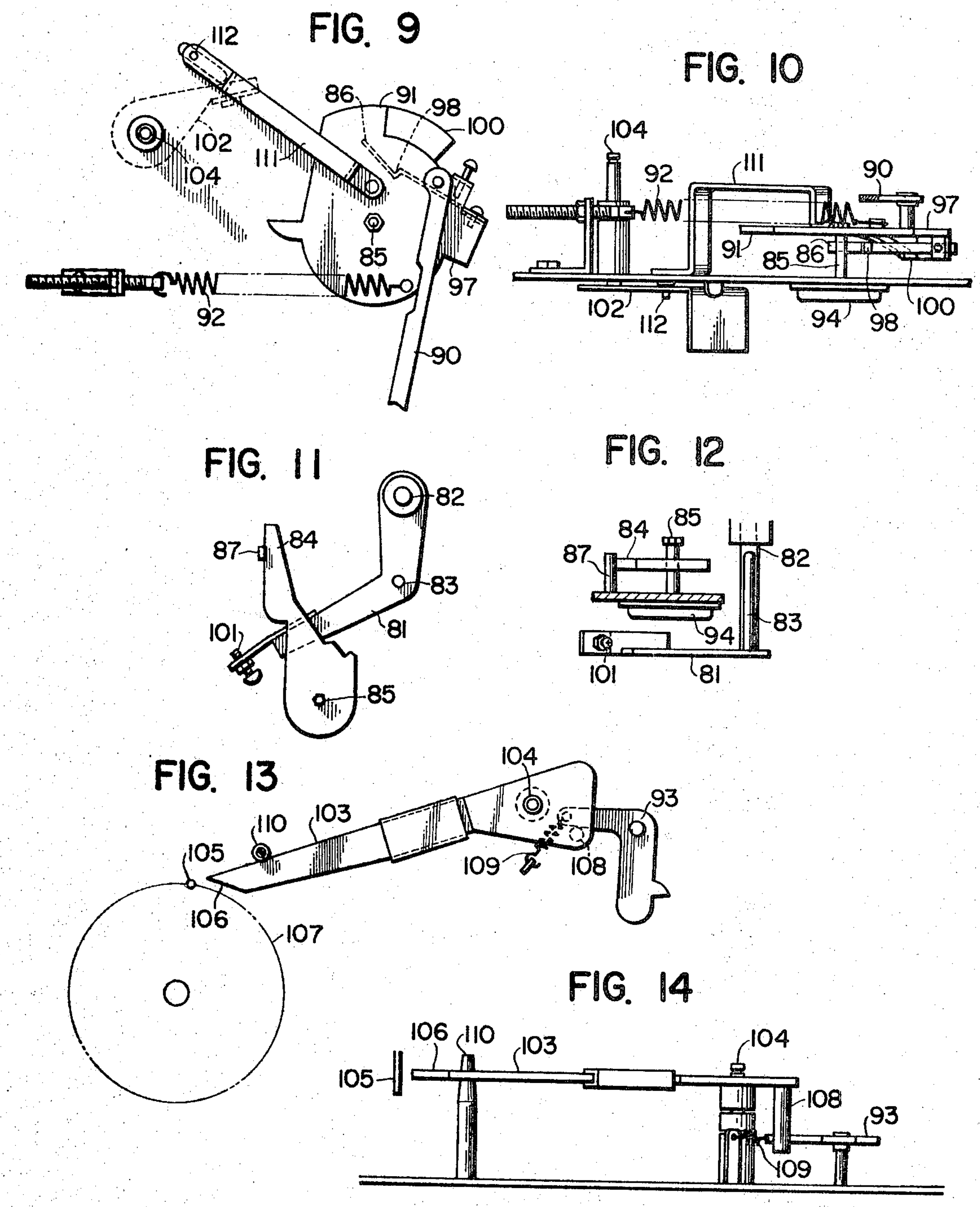
Figure 15:
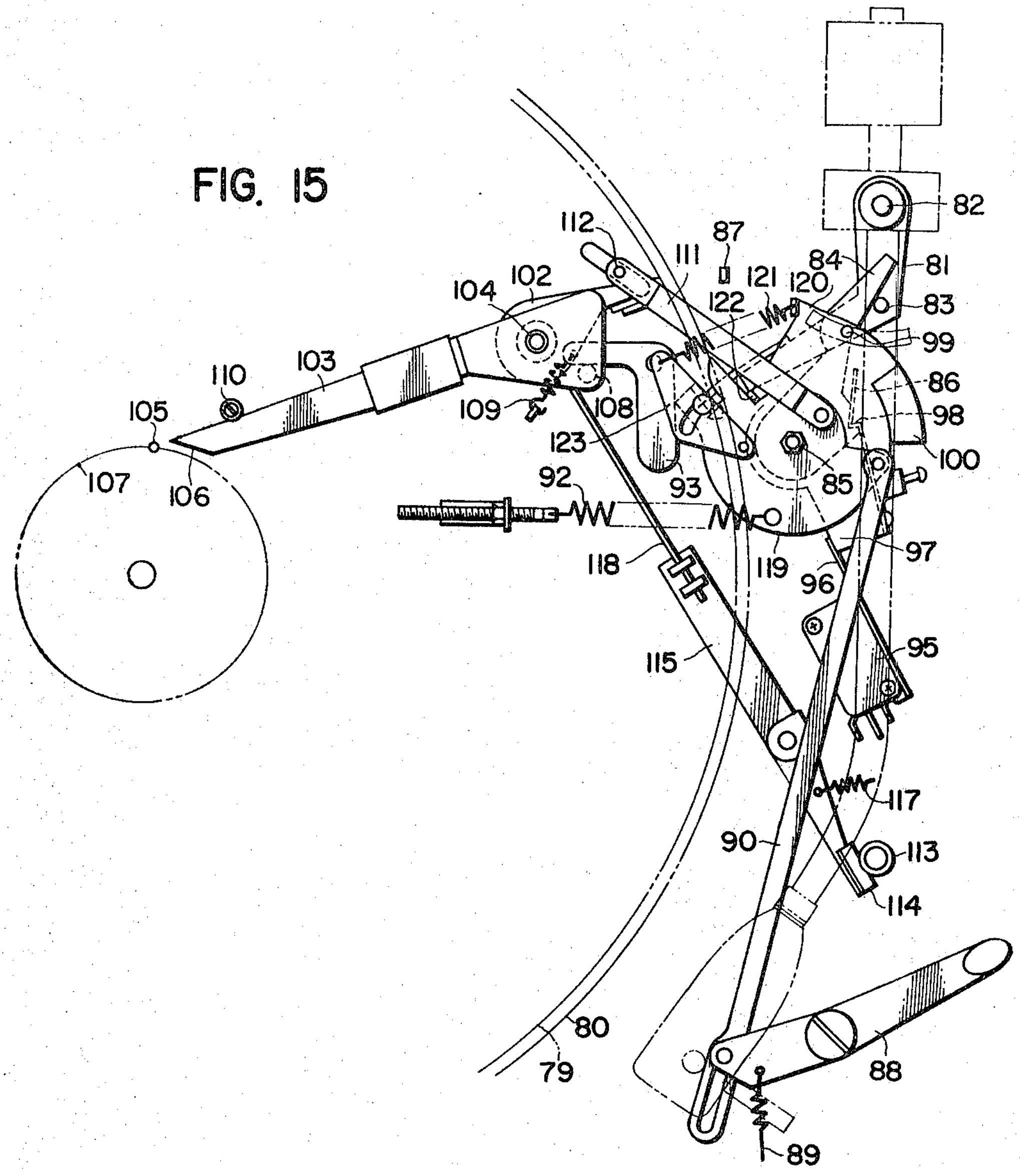
FIGS. 15 to 19 relate to the more improved one of the second embodiment.
Figure 16:
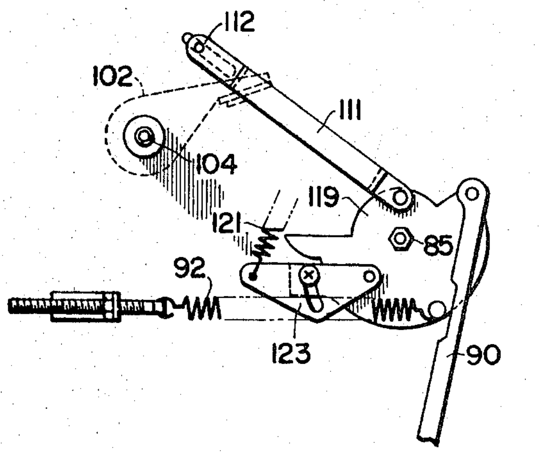
Figure 18:
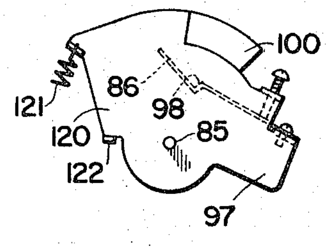
Figure 17:
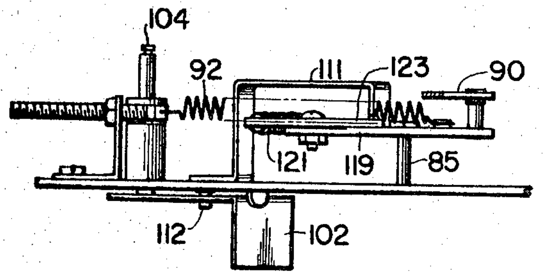
Figure 19:
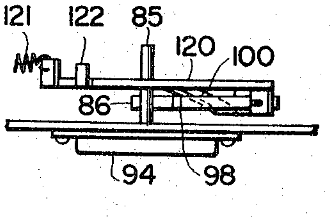

In FIGS. 5 and 7, when tone arm 78 is moved to the upper position of disc 79 placed on turntable 80, arm plate 81 which is joined with tone arm 78 by shaft 82 is also moved, pin 83 extending upwardly from arm plate 81, pushes plate 84, which is rotatably set on shaft 85; so, said plate 84 is set free from locking engagement with spring plate 86, and is rotated quickly to stopper pin 87 by the spring action of said spring plate 86. Therefore, there are no interferences in the moving of tone arm 78.

In FIG. 7, when start lever 88 is pulled against spring 89, lever 90 is moved upwardly. Rotary plate 91 is rotated against driving spring 92 by said lever 90, and is locked by lock lever 93. There is friction grease in grease chamber 94 (FIG. 10) and the friction plate which is connected with shaft 85 of rotary plate 91 is set in the grease chamber 94 (friction plate is not shown in the drawings), so that the friction plate can not rotate too fast. Therefore, if lever 90 is pulled strongly, rotary plate 91 will rotate slowly. When rotary plate 91 begins to rotate, switch 95 turns to ON state and turntable 80 begins to rotate, because switch spring 96 which was pressed by press piece 97 of rotary plate 91 is set free. At the last portion of the rotating period of rotary plate 91, plate 84, which has been rotated against stopper pin 87, is joined again by spring plate 86 at angle 98. On the other hand, during the rotating period of rotary plate 91, elevation pin 99 slips downward along slope 100 of rotary plate 91. Tone arm 78, which is supported by the above-mentioned elevation pin 99, descends slowly on record disc 79, and then the playback of disc 79 is begun. Now, each part is in the state shown as FIG. 8.

As record disc 79 is played, the top end of tone arm 78 moves around toward the center of disc 79, and at the same time, pushing pin 101, attached to the end of arm plate 81, makes traverse table 102 rotate counterclockwise. Lever 103, which is mounted on traverse table 102, is slowly rotated, too. Lever 103 and traverse table 102 can be rotated almost freely around shaft 104, therefore, tone arm 78 receives little irregular force. There is little pitch between one groove and the next groove of disc 79, so that lever 103 moves around very slowly. On the other hand, traveling pin 105 extending downwardly from the bottom of turntable 80 pushes top face 106 of lever 103 when said top face 106 comes around to orbit 107 of traveling pin 105. So, lever 103 does not turn into said orbit 107 but makes a stop, though said lever 103 is continuously added force to rotate by traverse table 102.

After disc 79 is played and the stylus of tone arm 78 is led in a last groove in which no signal is recorded, tone arm 78 is moved quickly. Traverse table 102 and lever 103 are quickly rotated, too. Rotating quickly, top face 106 of lever 103 comes inside the orbit 107 of traveling pin 105 and lever 103 is pushed by traveling pin 105 and then is quickly moved around a great distance. At this time, pin 108 extending down from lever 103 makes lock lever 93 rotate clockwise against the pulling force of spring 109. Rotary plate 91 gets free from locking, and then is rotated clockwise by driving spring 92. During the rotating period, elevation pin 99 slips upward along slope 100 of rotary plate 91. Therefore, tone arm 78 is pushed up and the stylus is slowly lifted up from disc 79.

Plate 84, which has already been caught by angle 98 of spring plate 86, is rotated together with rotary plate 91. After that, tone arm 78 is pushed up by elevation pin 99, plate 84 pushes pin 83 of arm plate 81 and makes tone arm 78 return to the arm rest. When rotary plate 91 finishes rotating, press piece 97 of rotary plate 91 presses switch spring 96. So, switch 95 turns to OFF state and turntable 80 stops rotating. Lock lever 93, which is rotated by lever 103, is immediately biased again by spring 109. At the same time, lock lever 93 pushes pin 108, and before traversing pin 105 comes around again, lever 103 is returned immediately to pin 110 by lock lever 93. Crank lever 111, which is pulled by rotary plate 91, has a sliding pin 112 whereby traverse table 102 is taken back.

Therefore, when disc 79 is completely played back, each part of this record player returns to the inoperative state again. In case it is necessary to stop this record player halfway, the problem can be resolved by pushing down button 113. When button 113 is pushed down, stop 114, which is extended from lever 115, is moved clockwise. Lever 115 is rotated around its shaft 116, against the force of spring 117, rod 118 attached lever 115 pushes pin 108; and lever 103 is moved around. Then each part is operated the same as the above-mentioned operation. That is, tone arm 78 is elevated by elevation pin 99 at first, and then returned to the arm rest by plate 84 which pushes pin 83 of arm plate 81.

The second embodiment of this invention relates to an improvement of rotary plate 91. That is, as shown from FIGS. 15 to 19, rotary plate 91 can be divided into first and second rotary plates 119 and 120. When tone arm 71 is moved around to the outer edge of disc 79, arm plate 81 which is joined with tone arm 78 by shaft 82 is moved too, and pin 83, extending upward from arm plate 81, pushes plate 84 which is rotatably set on shaft 85. Plate 84 is set free from locking spring plate 86, and is rotated quickly to stopper pin 87 by the spring action of said spring plate 86. Therefore, there are no interferences in moving of tone arm 78. Then, when start lever 88 is pulled against spring 89, lever 90 is moved upwardly. First rotary plate 119 is rotated against driving spring 92 by said lever 90, and is locked by lock lever 93. There is friction grease in grease chamber 94 and a friction plate which is connected with shaft 85 of the second rotary plate 120 is set in grease chamber 94 (friction plate is not shown in the drawings). Therefore, the friction plate can not rotate too fast. Being connected with the friction plate, the second rotary plate 120 which is joined with the first rotary plate 119 by spring 121 is rotated slowly following the rotation of first rotary plate 119 even though the first rotary plate 119 has been rotated quickly. During the rotating period of second rotary plate 120, elevation pin 99 slips downward along the slope 100 of second rotary plate 120.

As the first rotary plate 119 can be rotated without the resistance force of a friction plate, start lever 88 can be pulled lightly. Since the constant force of spring 121 and of the friction plate are added to plate 120, second rotary plate 120 can be rotated with almost constant velocity at every rotation period.

At the end of playback, when lock lever 93 unlocks the first rotary plate 119, first and second rotary plates 119 and 120 rotate together and slowly. Because the upright piece 122 of second rotary plate 120 is pushed by the first rotary plate 119, during the rotating period, elevation pin 99 slips upward along slope 100 of second rotary plate 120, and the tone arm 78 is pushed up. The stylus is slowly lifted up from disc 79, and tone arm 78 is returned to arm rest by plate 84. Adjustment plate 123 which is fixed to first rotary plate 119 adjusts the force of spring 121.

According to the second embodiment, when tone arm 78 makes traverse table 102 and lever 103 move around so that disc 79 is detected at its recorded end, tone arm 78 is not interfered with in its playback operation because they can move around very lightly. Moreover, when disc 79 is played back, tone arm 78 does not touch plate 84, which allows tone arm 78 to return to the arm rest at the last of playback.

Before disc 79 is played back completely, lever 103 is disposed in the waiting state and lever 103 is not rotated a large amount before tone arm 78 is led into the last grove. Therefore, there are no mistakes, for example, tone arm 78 is returned to arm rest while disc 79 is not played back completely.

Turntable 80 pushes lever 103 which can be rotated very lightly, and unlocks the locking of lock lever 93. As other operations are done with the charged energy of driving spring 92 and with the friction force of the friction plate without the inertia of turntable 80, the belt or idler are not harmed.

I claim:

1. A record player provided with an automatic control mechanism, comprising:

a. a record playing device having a phono-motor, a housing, a turntable for a record disc a tone arm and an arm rest therefore;

b. driving spring means for returning said tone arm to said arm rest adapted to be tensioned before playback of a disc and lock means for holding said spring in the tensioned state;

c. detecting means which operates at the end of playback and unlocks said lock means to release said spring means; and d. friction means for adding a resistance force to the pulling force of said driving spring means.

2. A record player provided with an automatic control mechanism, comprising:

a. a record playing device having a phono-motor, a housing, a turntable for a record disc, a tone arm, and an arm rest therefore;

b. driving spring means for returning said tone arm to said arm rest adapted to be tensioned before playback of a disc;

c. a first rotary plate which upon rotation tensions said driving spring at the beginning of playback of the disc;

d. detecting means which operates at the end of playback to release said tensioned driving spring means;

e. an elevation pin mounted in said housing for elevating said tone arm;

f. a second rotary plate having a slope cooperating with said elevation pin to move said pin up and down;

g. friction means for adding a resistance force against the pulling force of the driving spring; and h. a spring which connects said first rotary plate with said second rotary plate.